(12) United States Patent
Gallagher et al.

(10) Patent No.: US 12,551,814 B1
(45) Date of Patent: Feb. 17, 2026

(54) FASTENERS FOR FOAM CONSTRUCTION ELEMENTS

(71) Applicant: ImaginNoodles, LLC, Lancaster, PA (US)

(72) Inventors: Michael James Gallagher, Lancaster, PA (US); Christopher Gerard Gallagher, Lancaster, PA (US)

(73) Assignee: ImaginNoodles, LLC, Lancaster, PA (US)

( * ) Notice: Subject to any disclaimer, the term of this patent is extended or adjusted under 35 U.S.C. 154(b) by 188 days.

(21) Appl. No.: 18/498,909

(22) Filed: Oct. 31, 2023

Related U.S. Application Data

(60) Provisional application No. 63/381,695, filed on Oct. 31, 2022.

(51) Int. Cl.
*A63H 33/10* (2006.01)

(52) U.S. Cl.
CPC .................................. *A63H 33/101* (2013.01)

(58) Field of Classification Search
CPC .. A63H 33/044; A63H 33/101; A63H 33/108; F16B 5/0642; F16B 5/065; F16B 19/1081; F16B 21/082
USPC ........... 411/41, 908, 913; 446/121; 52/586.2
See application file for complete search history.

(56) References Cited

U.S. PATENT DOCUMENTS

| | | |
|---|---|---|
| 1,203,669 A | 11/1916 | Whiteside |
| 1,656,199 A | 1/1928 | Hodgson |
| 1,767,745 A | 6/1930 | Day |
| 2,171,648 A | 9/1939 | Ennis et al. |
| 2,238,039 A | 4/1941 | De Witt |
| 2,389,635 A | 11/1945 | Place |
| 2,401,976 A | 6/1946 | Simpson |
| 2,549,459 A | 4/1951 | Guest |
| 2,691,242 A | 10/1954 | Young |
| 2,799,118 A | 7/1957 | Lullo |
| 3,000,134 A | 9/1961 | Marini |
| 3,130,822 A | 4/1964 | Meyer |
| 3,205,611 A | 9/1965 | Onanian |
| 3,213,745 A | 10/1965 | Dwyer |

(Continued)

FOREIGN PATENT DOCUMENTS

| | | | |
|---|---|---|---|
| CA | 2164240 A1 | 6/1997 | |
| DE | 202007008204 U1 * | 10/2007 | ............ F16B 7/0473 |

(Continued)

*Primary Examiner* — Ryan D Kwiecinski
(74) *Attorney, Agent, or Firm* — Brian Roffe

(57) ABSTRACT

Fastener for foam construction elements such as logs, includes an elongate body and a central longitudinally extending axis. The body has first and second elongate parts, and a head connected to one end of each elongate part and which is biased when in a rest state of the body in which it has a width larger than an aperture of the foam construction elements to prevent passage therethrough. The first and second parts are movable relative to one another to change a width of the head to be smaller than the aperture of the foam construction elements to enable its insertion through such apertures. A flange at an opposite end of each elongate part projects outward from the central axis of the body and in combination have a width larger than the aperture of the foam construction elements to prevent passage therethrough, and thereby secure adjacent foam construction elements together.

20 Claims, 11 Drawing Sheets

(56) References Cited

U.S. PATENT DOCUMENTS

| | | | |
|---|---|---|---|
| 3,350,976 A * | 11/1967 | Topf | F16B 19/1081 411/510 |
| 3,431,813 A | 3/1969 | Johnson | |
| 3,440,784 A | 4/1969 | Onjukka | |
| 3,456,413 A | 7/1969 | Fischer | |
| 3,651,734 A | 3/1972 | McSherry | |
| 3,676,969 A | 7/1972 | Moore | |
| 3,690,031 A | 9/1972 | Shinoda | |
| 3,699,709 A | 10/1972 | Schmidt | |
| 3,716,939 A | 2/1973 | Pibet | |
| 3,769,772 A | 11/1973 | Oetiker | |
| 3,800,494 A | 4/1974 | Hall et al. | |
| 3,987,579 A | 10/1976 | Palenik, III | |
| 4,057,886 A * | 11/1977 | Brass | B29C 65/602 29/451 |
| 4,080,752 A | 3/1978 | Burge | |
| 4,086,014 A | 4/1978 | Jalaguier | |
| 4,104,952 A | 8/1978 | Brass | |
| 4,110,932 A | 9/1978 | Brass | |
| 4,159,592 A * | 7/1979 | Gabriel | A63H 33/101 446/124 |
| 4,197,781 A | 4/1980 | Giannuzzi | |
| 4,202,132 A | 5/1980 | Fischer | |
| 4,246,718 A | 1/1981 | Chatani | |
| 4,274,324 A * | 6/1981 | Giannuzzi | F16B 13/12 411/908 |
| 4,300,848 A * | 11/1981 | Waegemann | B42F 13/42 402/13 |
| 4,372,076 A | 2/1983 | Beck | |
| 4,391,077 A * | 7/1983 | Giess | E04B 2/704 52/748.11 |
| 4,571,134 A * | 2/1986 | Beglinger | B29C 45/26 411/509 |
| 4,657,458 A | 4/1987 | Wollar | |
| 4,704,057 A * | 11/1987 | McSherry | F16B 13/0808 411/344 |
| 4,739,543 A * | 4/1988 | Harris, Jr. | F16B 21/086 24/453 |
| 4,742,033 A | 5/1988 | Harris et al. | |
| 4,755,141 A | 7/1988 | Nakai | |
| 4,860,410 A | 8/1989 | Voller | |
| 4,878,790 A * | 11/1989 | McSherry | F16B 13/0808 411/340 |
| 5,028,186 A * | 7/1991 | McSherry | F16B 13/0808 411/908 |
| D325,869 S * | 5/1992 | Rubenstein | D8/385 |
| 5,199,919 A | 4/1993 | Glickman | |
| 5,253,458 A | 10/1993 | Christian | |
| 5,281,185 A * | 1/1994 | Lee | A63H 33/10 446/85 |
| 5,288,189 A * | 2/1994 | Hepworth | F16B 13/02 411/510 |
| 5,366,332 A * | 11/1994 | Murphy | F16B 5/0642 411/908 |
| 5,372,450 A | 12/1994 | Blodgett | |
| 5,704,753 A * | 1/1998 | Ueno | F16B 21/086 411/908 |
| 5,791,845 A | 8/1998 | Fulop | |
| 5,857,819 A * | 1/1999 | Lary | F16B 21/125 411/530 |
| 5,881,515 A | 3/1999 | George | |
| 5,929,906 A | 7/1999 | Arai et al. | |
| 6,074,144 A * | 6/2000 | Meyer | F16L 3/223 411/41 |
| 6,364,589 B1 * | 4/2002 | Wenglinski | F16B 5/065 24/297 |
| 6,533,515 B2 * | 3/2003 | Meyer | F16B 19/1081 24/453 |
| 6,595,825 B1 | 7/2003 | De Wilde | |
| 6,652,206 B2 * | 11/2003 | Heflin | F16B 19/1081 411/908 |
| 6,931,803 B1 | 8/2005 | Davis et al. | |
| 6,938,966 B1 | 9/2005 | Rouwhorst | |
| 6,964,593 B1 | 11/2005 | Stevens | |
| 7,243,401 B2 * | 7/2007 | Sawatani | F16B 19/1081 24/297 |
| 7,364,440 B2 | 4/2008 | Gobron et al. | |
| 7,669,324 B2 | 3/2010 | Daito | |
| 8,074,418 B2 | 12/2011 | Thiagarajan | |
| 8,347,465 B2 * | 1/2013 | Arisaka | F16B 19/1081 24/297 |
| 8,475,226 B2 | 7/2013 | Comfort | |
| 8,567,149 B2 | 10/2013 | Kuzmin | |
| 8,662,328 B2 | 3/2014 | Boisvert | |
| 8,671,640 B1 | 3/2014 | Thomas | |
| 8,690,505 B2 * | 4/2014 | Bishop | F16B 19/1081 411/21 |
| 8,850,683 B2 | 10/2014 | Haughey et al. | |
| 8,864,546 B1 | 10/2014 | Capriola | |
| 8,961,259 B2 | 2/2015 | Maggiore et al. | |
| 9,033,761 B2 | 5/2015 | Azmani | |
| 9,238,179 B2 | 1/2016 | Carpenter | |
| 9,377,042 B2 | 6/2016 | De Wilde | |
| 9,399,177 B2 | 7/2016 | Cohcella | |
| 9,458,872 B2 | 10/2016 | Nelson | |
| 9,618,027 B1 * | 4/2017 | Gold | F16B 19/002 |
| 9,649,993 B1 * | 5/2017 | Dickinson | F16B 5/0657 |
| 9,737,825 B2 | 8/2017 | Donohoe | |
| 9,789,417 B2 | 10/2017 | Vandoren | |
| 9,814,998 B2 | 11/2017 | Wei | |
| 10,130,894 B2 | 11/2018 | Peller | |
| 10,183,229 B2 | 1/2019 | Donohoe | |
| 10,272,353 B2 | 4/2019 | Oh | |
| 10,398,999 B2 | 9/2019 | Cochella | |
| 10,493,371 B2 | 12/2019 | Cochella et al. | |
| 10,518,193 B2 | 12/2019 | You | |
| 10,526,783 B2 | 1/2020 | Hon | |
| 11,098,746 B2 * | 8/2021 | Malone, III | F16B 39/04 |
| 11,828,313 B2 * | 11/2023 | Mouillon | F16B 19/1081 |
| 12,172,096 B1 * | 12/2024 | Gallagher | A63H 33/044 |
| 2003/0024187 A1 | 2/2003 | Wilt | |
| 2003/0036333 A1 | 2/2003 | Oakley | |
| 2003/0049992 A1 | 3/2003 | Leemon | |
| 2004/0244158 A1 * | 12/2004 | Awakura | F16B 5/0642 24/458 |
| 2005/0095949 A1 * | 5/2005 | Fernandez, Jr. | A63H 33/107 446/236 |
| 2007/0123137 A1 * | 5/2007 | Marzetta | A63H 33/105 446/120 |
| 2007/0218801 A1 | 9/2007 | Weinshanker | |
| 2007/0277459 A1 * | 12/2007 | Marzetta | A63H 33/101 52/281 |
| 2008/0142670 A1 * | 6/2008 | Cvelbar | F16B 21/082 248/544 |
| 2008/0196222 A1 * | 8/2008 | Park | F16B 5/0614 403/291 |
| 2009/0301012 A1 | 12/2009 | Stein | |
| 2010/0009593 A1 * | 1/2010 | Hotti | A63H 33/101 446/127 |
| 2010/0011686 A1 | 1/2010 | Stein | |
| 2010/0151765 A1 | 6/2010 | Kwak et al. | |
| 2010/0210172 A1 | 8/2010 | Worthington et al. | |
| 2010/0273388 A1 | 10/2010 | Carlson et al. | |
| 2011/0116890 A1 * | 5/2011 | Okada | F16B 19/1081 411/358 |
| 2012/0020726 A1 * | 1/2012 | Jan | F16B 5/0642 403/330 |
| 2012/0184174 A1 | 7/2012 | Kwak et al. | |
| 2013/0095722 A1 | 4/2013 | Cochella | |
| 2013/0237120 A1 * | 9/2013 | Haner | A63H 33/04 446/153 |
| 2013/0330998 A1 | 12/2013 | Fox et al. | |
| 2014/0086704 A1 * | 3/2014 | Hemingway | B22F 5/06 411/378 |
| 2014/0273712 A1 | 9/2014 | Uttley et al. | |
| 2015/0247328 A1 | 9/2015 | Correia et al. | |
| 2015/0375132 A1 | 12/2015 | Cheung | |
| 2016/0136536 A1 | 5/2016 | Ben Shalom | |
| 2016/0160515 A1 | 6/2016 | Wallance | |
| 2016/0310864 A1 | 10/2016 | Cheung | |
| 2018/0118488 A1 | 5/2018 | Suzuki et al. | |

(56) References Cited

U.S. PATENT DOCUMENTS

| | | |
|---|---|---|
| 2018/0177488 A1 | 6/2018 | Pathania et al. |
| 2018/0296938 A1* | 10/2018 | Gallagher ............ A63H 33/101 |
| 2018/0296983 A1 | 10/2018 | Dacey, Jr. et al. |
| 2020/0038772 A1 | 2/2020 | Wong et al. |
| 2020/0054957 A1 | 2/2020 | Chan et al. |
| 2020/0054958 A1* | 2/2020 | Gallagher ............ A63H 33/101 |
| 2020/0230513 A1* | 7/2020 | Chao .................... A63H 33/107 |
| 2020/0282322 A1 | 9/2020 | Gallagher |
| 2021/0131096 A1* | 5/2021 | Mordechai ................ E04B 1/32 |
| 2021/0332842 A1* | 10/2021 | Lee ..................... F16B 19/1081 |
| 2022/0347594 A1* | 11/2022 | Marzetta .............. A63H 33/101 |
| 2024/0410161 A1* | 12/2024 | Kongshaug ............. E04B 1/388 |

FOREIGN PATENT DOCUMENTS

| | | | | |
|---|---|---|---|---|
| GB | 2041228 A | * | 9/1980 | ........... A63H 33/101 |
| GB | 2411605 A | * | 9/2005 | ........... A63H 33/101 |
| GB | 2587776 A | * | 4/2021 | ........... A63H 33/101 |
| WO | WO-9947224 A1 | * | 9/1999 | ........... A63H 33/101 |
| WO | WO-0057979 A1 | * | 10/2000 | ........... A63H 33/101 |
| WO | WO-03031011 A1 | * | 4/2003 | ............ A63H 33/10 |
| WO | WO-2008096039 A1 | * | 8/2008 | ........... A63H 33/101 |
| WO | WO-2024105441 A1 | * | 5/2024 | ................ F16B 2/14 |

* cited by examiner

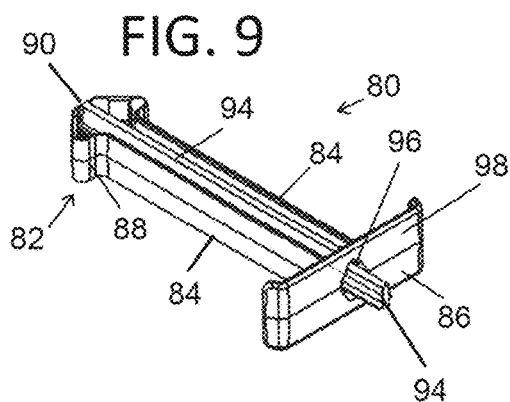
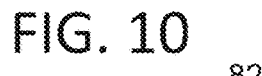
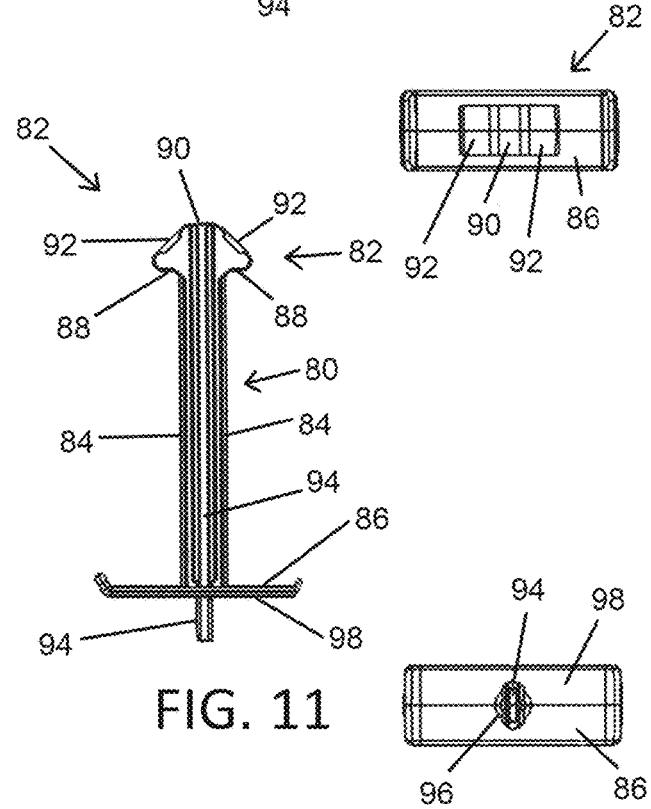
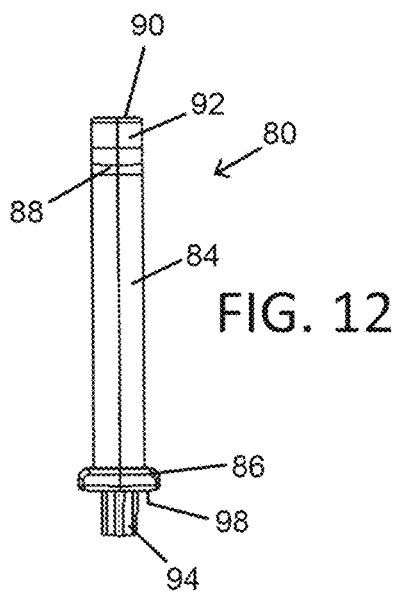
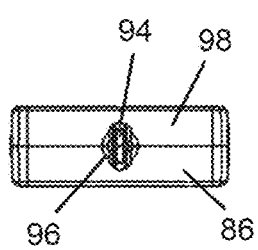

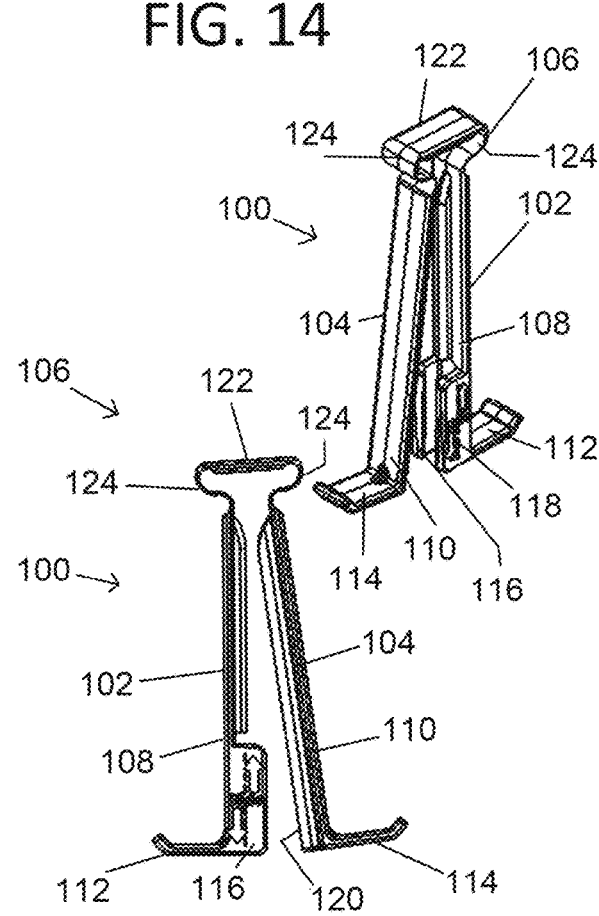
FIG. 14
FIG. 16
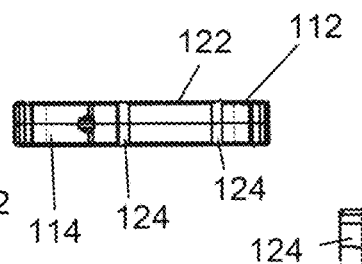
FIG. 15
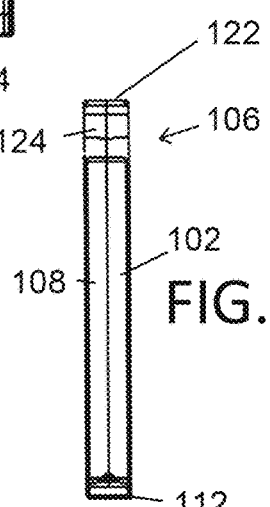
FIG. 17
FIG. 18

FASTENERS FOR FOAM CONSTRUCTION ELEMENTS

CROSS-REFERENCE TO RELATED APPLICATION

The present application claims priority of U.S. provisional patent application Ser. No. 63/381,695 filed Oct. 31, 2022, the disclosure of which is incorporated by reference herein.

FIELD OF THE INVENTION

The present invention relates generally to connectors or fasteners for toy construction playsets and more particularly to fasteners for toy construction playsets that are easy to use and provide a secure attachment of adjacent components of the playset to one another, or possibly two parts or areas of the same component.

The present invention also relates to toy construction playsets including lightweight logs and other building components made of expanded plastic foam, such as polyethylene or polyurethane, and fasteners to enable attachment of the logs and other building components to one another in numerous and varied forms. Even more particularly, the present invention relates to toy construction playsets and soft, creative environments that can be built to tower above a child's head without concern of injury due to collapse.

The present invention also relates generally to toy construction playsets with one-piece molded fasteners to hold toy construction flexible substrates together that are large enough to pass the toy industry's Small Part Gauge, including components commonly referred to as pool noodles or swim noodles.

BACKGROUND OF THE INVENTION

Children's blocks have forever been a source of creative play. Frank Lloyd Wright, and other thought leaders famously credit their childhood blocks as a valuable educational resource from their early youth and/or a significant outlet for their creative minds from a very early age. While playing with blocks is often an immersive experience, few sets of blocks allow for the construction of structures that are full size play sets. The risk of such a structure falling on a child has typically prevented this scale of immersive play set.

The blocks are great for inside or outside play. While the playset of blocks is designed for the real world, a computer-based playset for the computer world is one option. In this way, children can plan their designs on the computer, make them in the real world and play with them in either environment.

Children also have access to toy construction playsets including expanded plastic foam noodles that are hollow custom extrusion profiles resembling logs, and hereinafter referred to as "foam logs" or "logs". These logs are often connectable to each other with the use of fasteners designed to engage adjacent logs in a secure manner.

The inventors have several prior applications directed to logs, swim noodles, pool noodles, and related products, including, U.S. patent application Ser. No. 15/344,333 filed Nov. 4, 2016, Ser. No. 15/951,199 filed Apr. 12, 2018, Ser. No. 16/664,891 filed Oct. 27, 2019 and Ser. No. 16/884,258 filed May 27, 2020, all of which are incorporated by reference herein. Among other things, these patent applications disclose the structure of foam construction elements such as foam logs, swim noodles and pool noodles, and planar substrates with apertures or portals used for fastening them together, and assemblies of foam construction elements that require fasteners to build and maintain structural integrity.

OBJECTS AND SUMMARY OF THE INVENTION

It is an object of at least one embodiment of the present invention to provide new and improved fasteners for toy construction playsets, toy construction playsets including such fasteners, and methods for using such toy construction playsets.

It is another object of at least one embodiment of the present invention to provide new and improved one-piece molded fasteners to hold foam toy construction flexible substrates together, toy construction playsets including such fasteners, and methods for using such toy construction playsets.

It is another object of at least one embodiment of the present invention to provide molded fasteners for toy construction logs that are to be connected to each other and which squeeze or compress to pass easily through apertures, holes, or portals in walls of each of a pair of adjacent logs or other toy construction playset components.

It is another object of at least one embodiment of the present invention to provide a building system for children in particular that allows them to construct structures from hollow foam extrusions or foam logs that are stackable so they can make playsets of their own design or existing designs in which they can hide, play, and let their imaginations soar.

The importance of a one-piece fasteners construction cannot be underestimated in that it allows everyone and in particular small children to use the fasteners while not requiring the dexterity needed to align and manipulate small parts such as nuts and bolts and other two piece fastening systems. One-piece plastic fasteners also allow for low-cost fabrication so the toys are affordable. All described fasteners are of the size that pass the Children's Choke Gauge safety standard.

In order to achieve one or more of these objects, and possibly others, a fastener for foam construction elements in accordance with the invention includes an elongate body having a first end, a second end opposite to the first end, and a central longitudinally extending axis. The body includes a first elongate part having a first end and a second end opposite the first end, a second elongate part having a first end and a second end opposite the first end, and a head connected to the first end of the first elongate part and the first end of the second elongate part. The head is biased when in a rest state of the body in which it has a width larger than an aperture of the foam construction elements. The first and second parts are movable relative to one another to change a width of the head to be smaller than the aperture of the foam construction elements, and enable it to pass through such an aperture.

In some embodiments, the head is shaped as an arrowhead with a smaller upper cross-section than a lower cross-section. To this end, the head may include an angled part on the first part and an angled part on the second part, with each of these angled parts having a first planar portion, a second planar portion at an obtuse angle to the first planar portion and which is angled outward from the central axis of the body and away from the first end of the body, and undercut surfaces that connect to the first and second parts. Alternatively, each angled part can present a semi-circular cross-section at a lower surface and a cross-sectional shape of the angled parts from an upper surface transitioning to the semi-circular cross-section at the lower surface.

A flange is at the second end of each of the first and second parts, and projects outward from the central axis of the body and in combination in the rest state of the fastener, the flanges have a width larger than the aperture of the foam construction elements to prevent them from passing through the aperture. Also, the width of the flanges in combination in the rest state of the fastener have a width larger than a width of the angled parts in combination in the rest state of the body.

In some embodiment, the fastener includes a hinge structure extending between the first and second parts and defining a pivot axis in a longitudinal direction for enabling the first and second parts to pivot about the pivot axis to thereby reduce the width of the head. For example, the hinge structure may include a first hinge at the first end of the body and a second hinge at the second end of the body and which is separated from the first hinge. There may be a single hinge between the first and second parts that defines a pivot axis for enabling the first and second parts to pivot about the pivot axis to thereby reduce the width of the head. In this case, each of the first and second parts includes a respective longitudinal portion extending from an upper surface of the body to a lower surface of the body alongside the hinge, inner edges of the longitudinal portions being spaced apart from one another to define a channel and the hinge being at a bottom of the channel.

The body can include a standing rib alongside the angled parts and extending perpendicular to a rear surface of the body, the rib providing in combination with angled parts a trifold construction for the body. The rib may be rigid and forms a T-shaped with the angled parts when the angled parts are fully extended away from the rib. The rib can have the same cross-sectional shape as the angled parts.

In one embodiment, the first part includes a longitudinally extending wall and a pair of spaced apart guide walls extending inward from peripheral edges of the wall of the first part. The second part includes a longitudinally extending wall and a rib extending inward from the wall of the second part apart from peripheral edges of the wall of the second part, This rib is configured to lie between the guide walls when the walls of the first and second parts are adjacent one another. The first and second parts are movable relative to one another when the walls of the first and second parts are adjacent to one another to cause the head to change its width to be smaller than the aperture of the foam construction elements. In this embodiment, the head can include a planar portion and curved portions extending from opposite edges of the planar portion to ends of the walls of the first and second parts. The width of the head is changed by changing an orientation of the head upon movement of the first and second parts relative to one another. Also, the first and second parts may be biased into a state in which the walls of the first and second parts are apart from one another.

Another embodiment of a fastener for foam construction elements in accordance with the invention includes an elongate body having a first end, a second end opposite to the first end, and a central longitudinally extending axis. The body includes a deformable arrowhead at the first end, a flange at the second end having an aperture, two spaced apart, rigid walls extending longitudinally between the flange and the arrowhead, and a spine connected at one end to the arrowhead and passing through the aperture in the flange. In this manner, a portion of the spine extends beyond the flange. The spine is movable relative to the walls to deform the arrowhead to reduce its width. The spine may be situated between the walls.

The arrowhead preferably includes a planar surface, angled surfaces extending from opposed lateral edges of the planar surface, and undercut surfaces connecting the angled surfaces to the walls, the spine being connected to the planar surface. The body may be configured to be repeatedly movable between a state in which the arrowhead is deformed and a state in which the arrowhead is not deformed, The arrowhead is thus insertable at least partly through adjoining foam construction elements when deformed, then movable to be non-deformed to lock the adjoining foam construction elements together, and is removable from the adjoining foam construction elements when the arrowhead is subsequently deformed.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

As used herein, the toy construction foam elements are often referred to by the applicant as pool noodles, which are also referred to elsewhere as swim noodles. The fasteners disclosed herein are particularly useful for locking such pool or swim noodles together.

Fasteners disclosed herein are designed to pass through one swim noodle and into the void of an adjacent swim noodle and lock them together. While this through design solution could work on the larger logs, it would be too long and too costly. Not all of the fasteners disclosed herein can be used with all swim or pool noodles. Rather, some fasteners may not be able to be used with specific swim or pool noodles because, for example, the swim or pool noodles may be too small for larger logs or they require that the user insert them between the noodles.

Some of the fasteners disclosed herein are configured to be inserted through the swim noodles not from between them because they are not flexible as the larger logs. Inserting fasteners between pool noodles would require that there is a space between the noodles, which is not desirable for some constructions. The larger logs flex inward to allow fasteners to be put between them. Pool noodles have thicker walls and are more rigid so getting the user's fingers between them would not work. Also leaving inch-wide gaps between swim noodles is also not desirable.

A better understanding of the disclosed technology will be obtained from the following detailed description of the preferred embodiments, taken in conjunction with the drawings and the attached claims.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 9 is a perspective view of a third embodiment of a fastener in accordance with the invention;

FIG. 10 is a top view of the fastener shown in FIG. 9;

FIG. 11 is a front view of the fastener shown in FIG. 9, the rear view being the same;

FIG. 12 is a left side view of the fastener shown in FIG. 9, the right side view being the same;

FIG. 13 is a bottom view of the fastener shown in FIG. 9;

FIG. 14 is a perspective view of a fourth embodiment of a fastener in accordance with the invention;

FIG. 15 is a top view of the fastener shown in FIG. 14;

FIG. 16 is a front view of the fastener shown in FIG. 14, the rear view being a mirror image thereof;

FIG. 17 is a left side view of the fastener shown in FIG. 14, the right side view being the same;

FIG. 18 is a bottom view of the fastener shown in FIG. 14; and

DETAILED DESCRIPTION OF THE INVENTION

Figure 1:
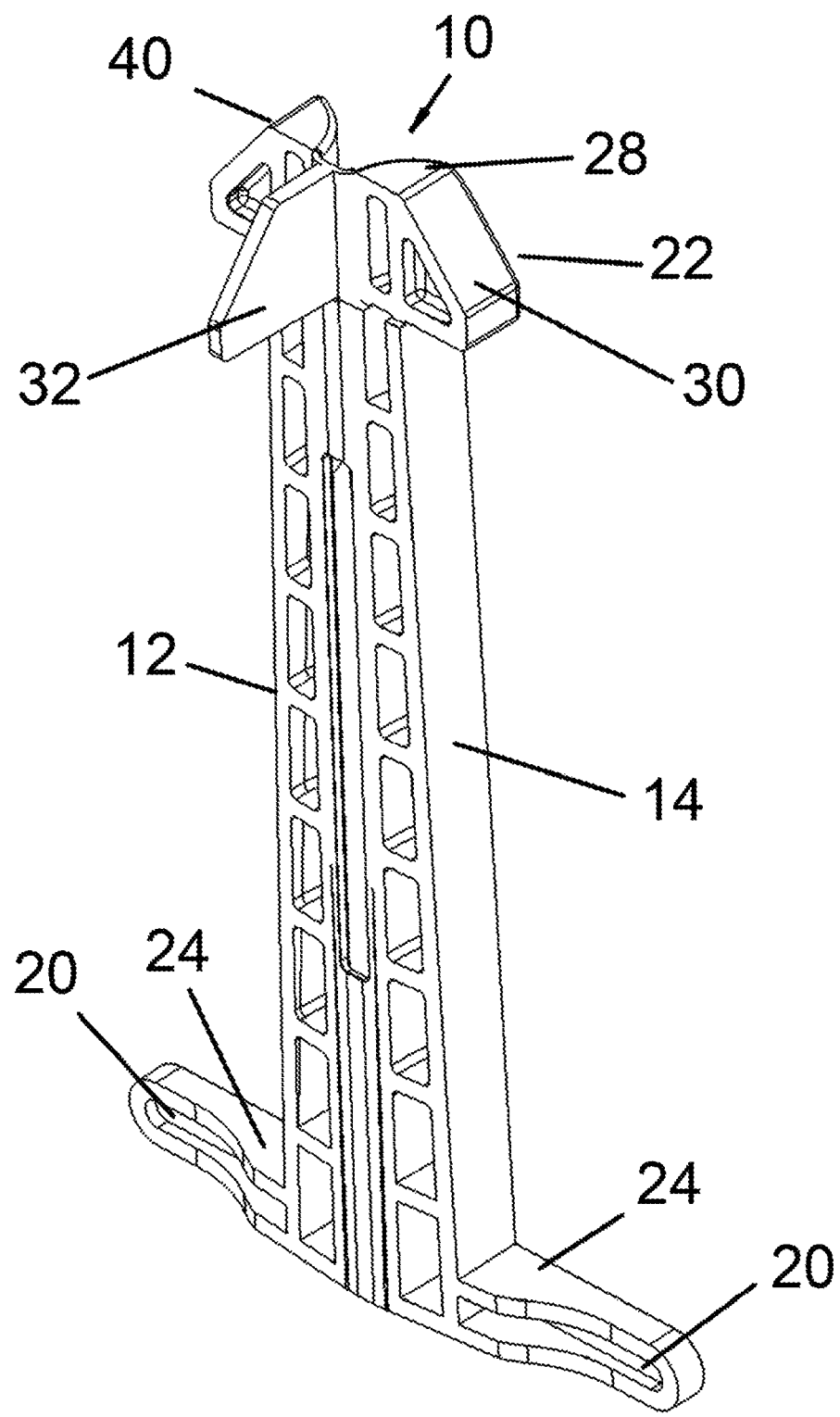
FIG. 1 is a perspective view of a first embodiment of a fastener in accordance with the invention.
Figure 2:
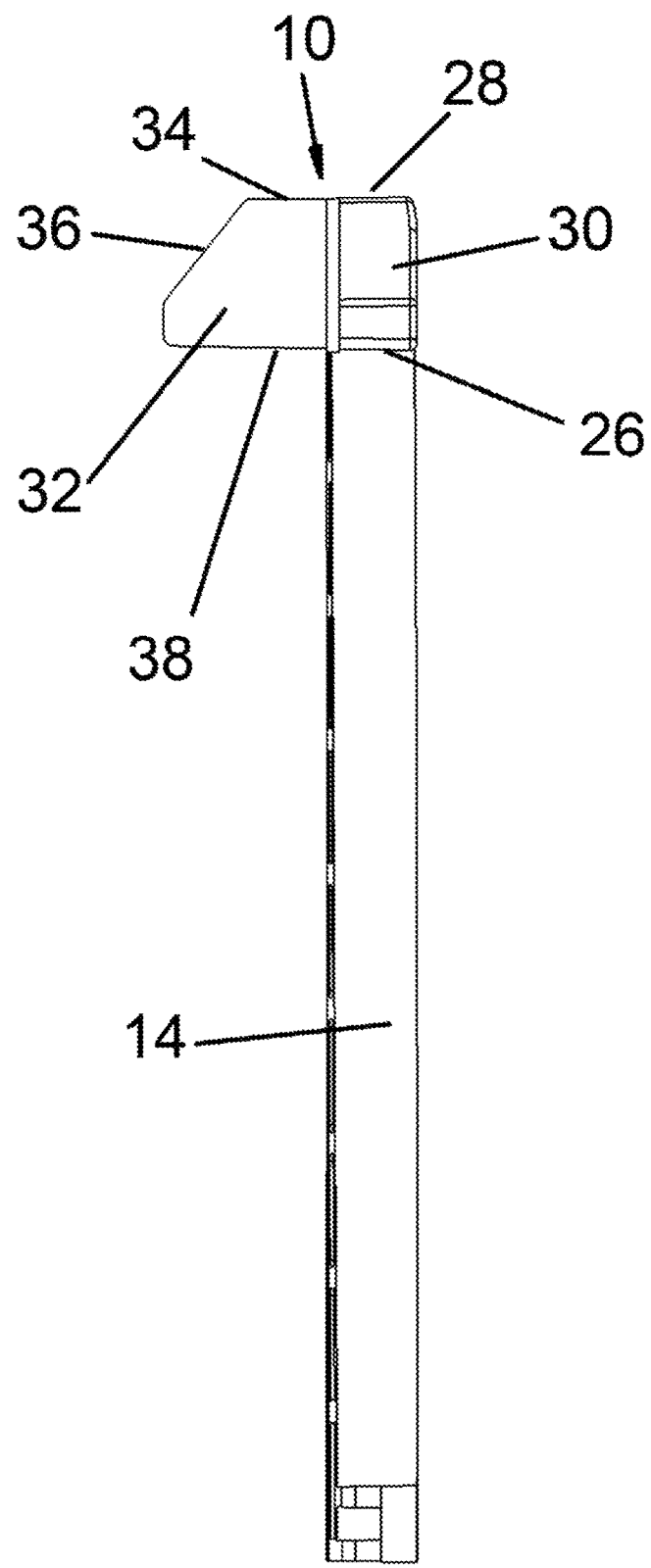
FIG. 2 is a right side view of the fastener shown in FIG. 1.
Figure 3:
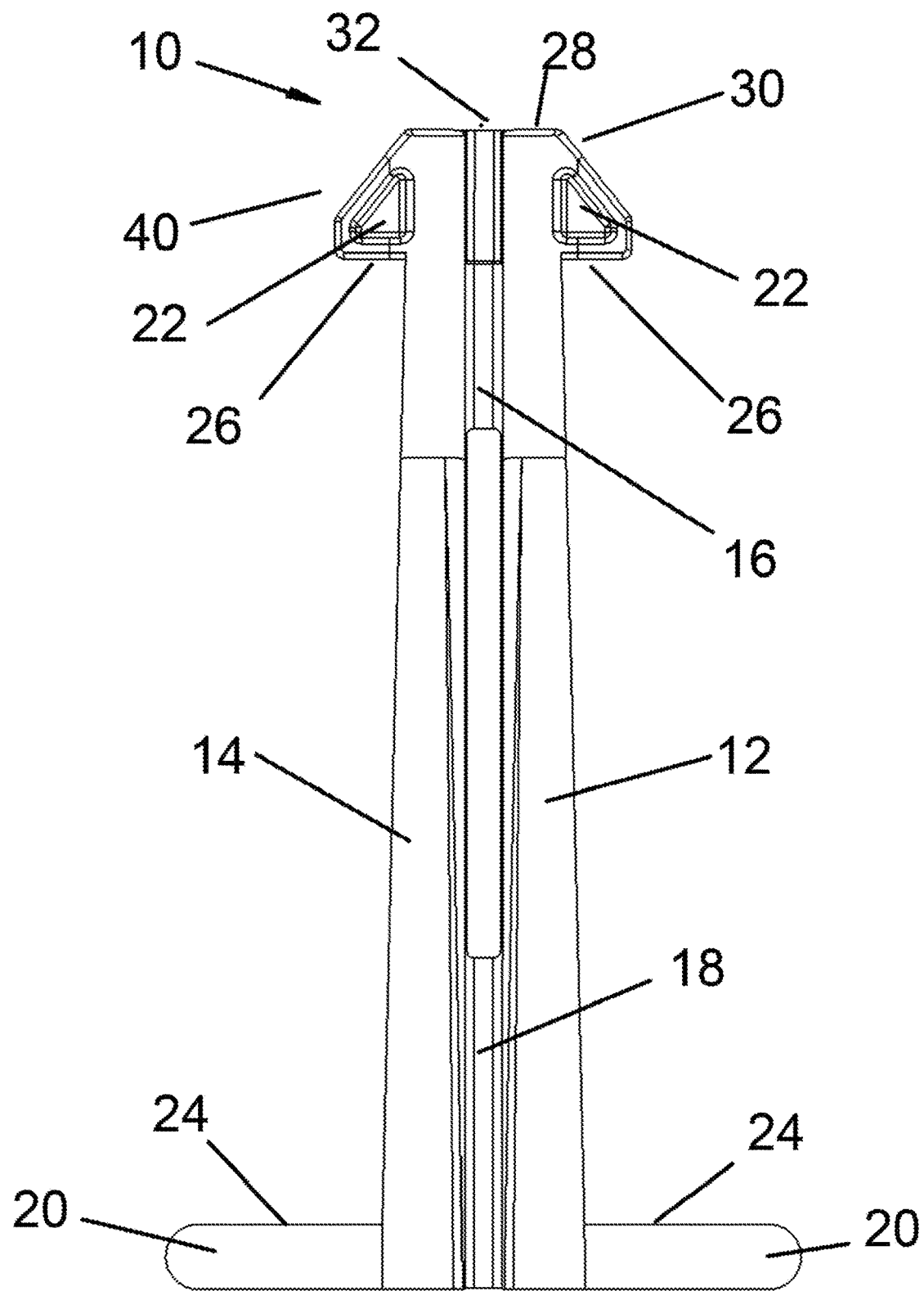
FIG. 3 is a rear view of the fastener shown in FIG. 1.
Figure 4:
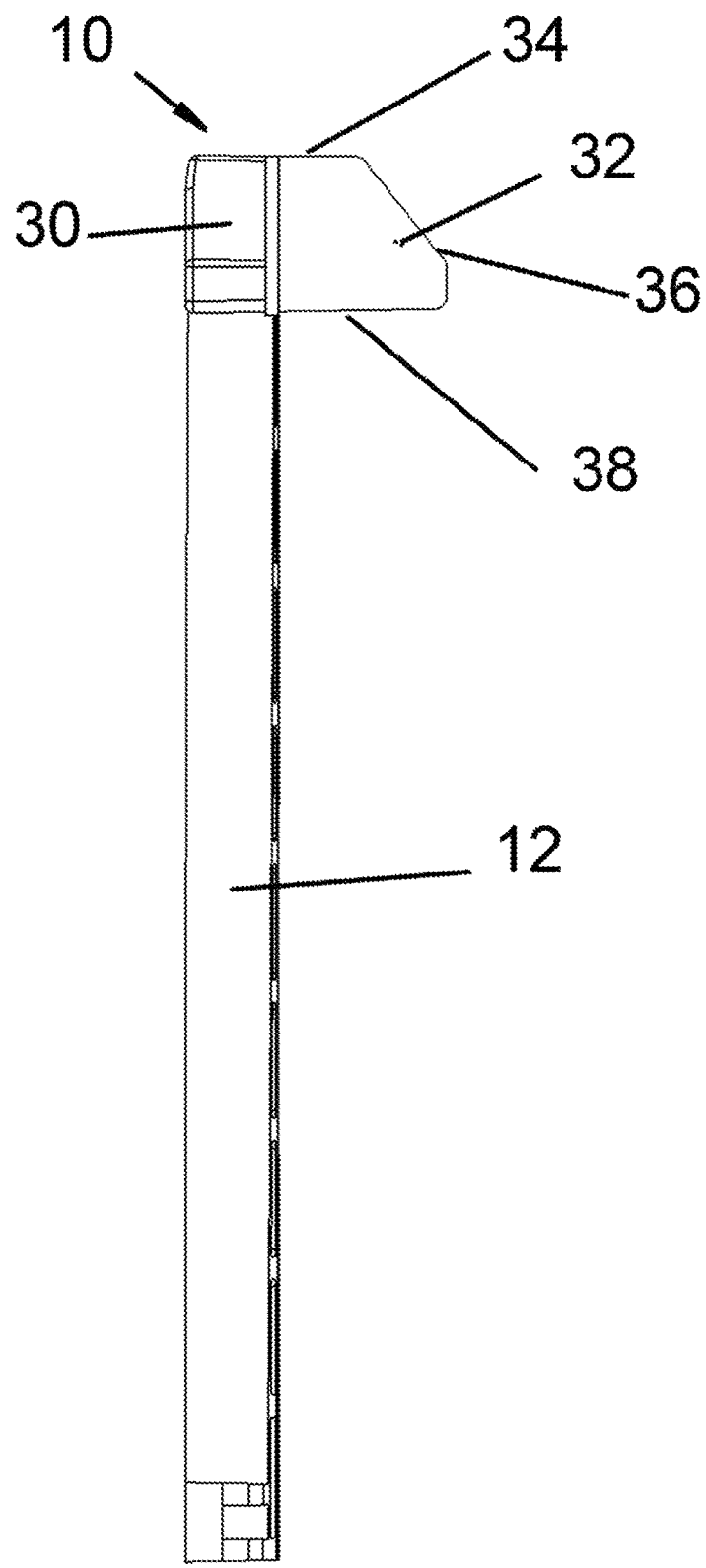
FIG. 4 is a left side view of the fastener shown in FIG. 1.
Figure 5:
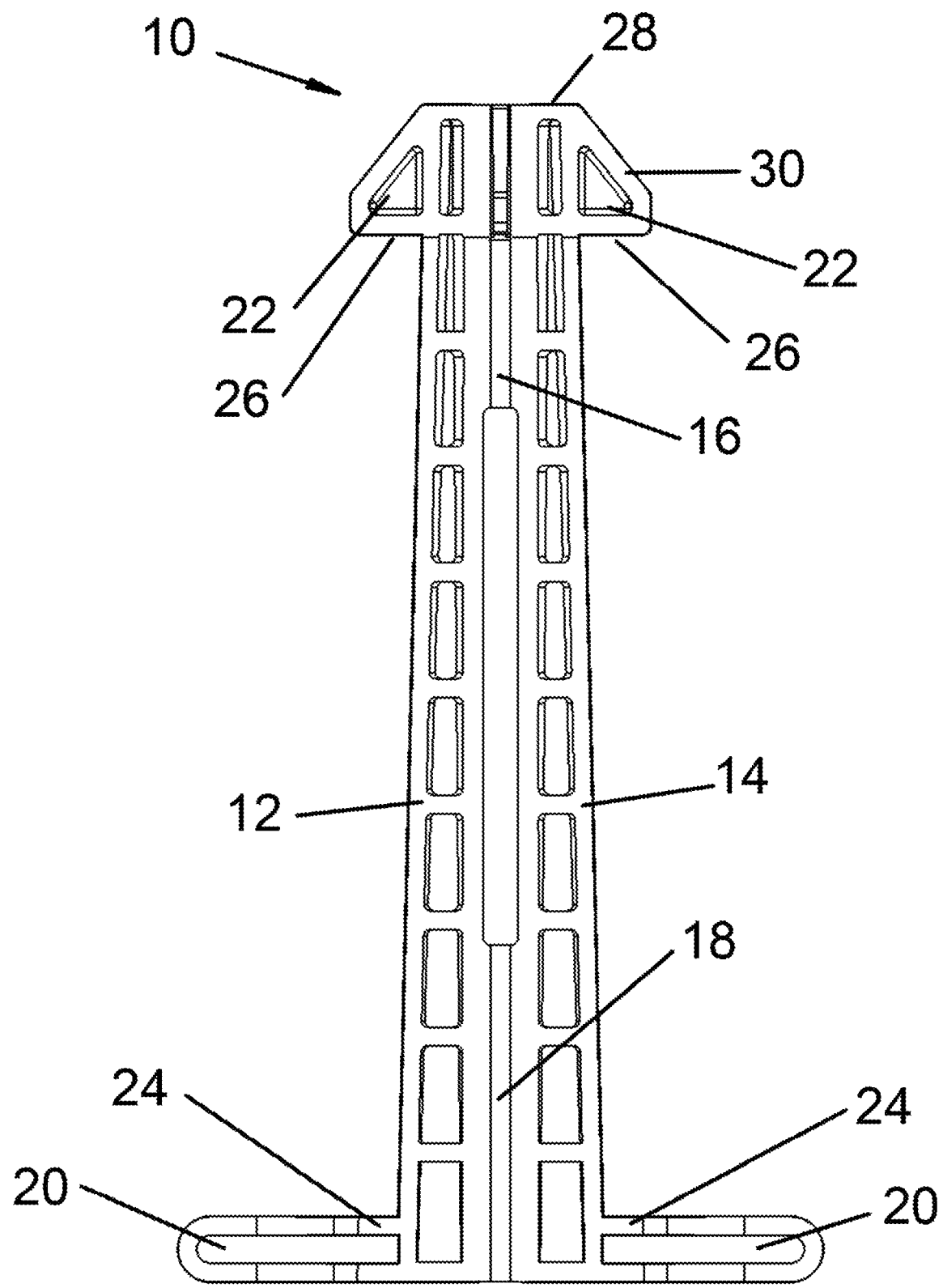
FIG. 5 is a front view of the fastener shown in FIG. 1.
Figure 6:
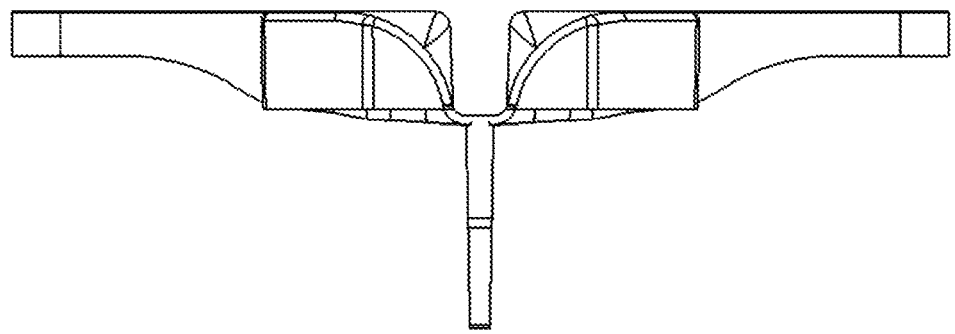
FIG. 6 is a top view of the fastener shown in FIG. 1.

Several embodiments of fasteners are disclosed herein that connect and preferably lock two or more pieces of extruded foam together, e.g., two logs of a foam construction playset which will be considered herein as foam construction elements, by passing through apertures in the foam construction elements and exerting a force pressing the foam construction elements against one another and/or preventing separation of the foam construction elements once connected together. The fasteners can also be used to connect two parts of the same foam construction element together, e.g., by bending an elongate foam construction element over onto itself so that multiple apertures of the single foam construction element align and then connecting the foam construction element to itself at these locations. Accordingly, although the disclosure below will generally refer to the connection of two foam construction elements together for the sake of convenience, it should be understood that the two foam construction elements being connected together may be parts of the same construction element.

Some of the fasteners disclosed herein each have a body, a flange structure at one end of the body, and an arrowhead or tip portion at the opposite end of the body. Fasteners disclosed herein also typically have a unitary, one-piece construction of the body, i.e., each is made of a single piece of plastic by a conventional manufacturing process. To provide the fasteners with their compressed and expanded states, the fasteners are either provided with a hinge structure or alternatively with a pivot mechanism to enable two parts of the fastener to pivot relative to one another. The fasteners are biased into the expanded state so manual force is needed to move the fasteners to their compressed state.

These fastener are designed to be inserted while in their compressed state through one or more apertures in each of the connected foam construction elements by pushing the arrowhead in a forward direction through aligning apertures in the foam construction elements to be connected together until the arrowhead is beyond the last aligning aperture and the flange portion has not been inserted through any of the aligning apertures. From this position, the fastener is then moved to its expanded state in which the flange portion prevents movement of the fastener in the forward direction and the arrowheads prevent movement of the fastener in the rearward direction. Appropriate dimensioning of the fastener relative to the size of the apertures in the foam construction elements, usually the diameter since the apertures are circular, and the thickness of the foam construction elements enables the fastener to lock the foam construction elements together in addition to preventing their separation. Separation of the foam construction elements is possible only by moving the fastener to its compressed state and then moving it rearward while maintaining it in the compressed state until the arrowhead clears all of the aligning apertures in the previously connected foam construction elements.

Referring to the accompanying drawings wherein the same reference numbers refer to the same or similar elements, FIGS. 1-6 show a first embodiment of a fastener 10 in accordance with the invention that includes a singular body having two elongate generally C-shaped parts 12, 14 connected via an integral hinge mechanism, which is comprised of an upper hinge 16 in an upper end region of the fastener 10 and a lower hinge 18 in a lower end region of the fastener 10. The upper and lower hinges 16, 18 align with one another, i.e., they pivot about the same axis that extends in the longitudinal or axial direction of the body of the fastener 10, and are separated by an elongate space in a middle region of the fastener 10 in its longitudinal or axial extent. The convention of the hinge 18 being referred to as the upper hinge at the upper end region of the fastener 10 is solely for the purpose of explanation with reference to the orientation of the fastener 10 in the drawings and the fastener 10 can be oriented in any direction and is not limited to the direction shown in the drawings. This, the upper hinge 16 may be considered to be a first hinge and the lower hinge 18 may be considered to be a second hinge.

The hinge mechanism can be formed by alternative structure(s) so that as used for this embodiment, the hinge mechanism or hinge means are considered to encompass any type of plastic structure that enables the two parts 12, 14 to pivot about an axis defined by the hinge means between a position in which the parts 12, 14 are in an expanded state (shown in FIGS. 1-5) and a position in which the parts 12, 14 are in a compressed state. A living hinge in one such exemplifying, but non-limiting structure. Indeed, the splitting of the hinge mechanism into an upper hinge 16 and a lower hinge 18, or more generally into two sections is not necessary, although it is expected to provide for a reduction in the force needed to close the fastener 10 for removal.

The parts 12, 14 are preferably mirror image parts so that although there is vertical symmetry of the fastener 10 about the central, longitudinally extending axis of the body as shown, there is no horizontal symmetry of the fastener 10.

Each part 12, 14 includes a paddle or flange 20 at a bottom end that projects outward from a central axis of the fastener 10 in a radial direction, and a barb or angled part 22 at the upper end that projects outward from the central axis in a radial direction. The flanges 20 in combination define a flange portion of the body of the fastener 10. The angled parts 22 define an arrowhead of the body of the fastener 10 in combination. The compressed state of the fastener 10 is achieved for example by grasping the flanges 20 and moving them in the direction of arrows A until the rear surfaces of the parts 12, 14 face or are adjacent to one another. The flanges 20 at the bottom ends of the parts 12, 14 can be substituted for by another arrowhead defined by two angled parts on each part 12, 14, that perform the same function as the flanges 20.

The outward extension of each flange 20 from the central axis of the body of the fastener 10 is dimensioned so that when the flanges 20 on both parts 12, 14 extend outward as in the position shown in FIGS. 1-6 (the expanded state of the fastener 10), the distance between the outward ends of the flanges 20 is larger than the diameter of an aperture in a foam construction element that is being connected using the fastener 10. As such, the fastener 10 cannot pass through the aperture when the flanges 20 on both parts 12, 14 extend outward in the expanded state of the fastener 10 because the upper surfaces 24 of the flanges 20 would face the surface surrounding the aperture in the foam construction element and contact it if an attempt were to be made to push the fastener 10 through the aperture from its lower end or pull the fastener 10 through the aperture from its upper end.

The outward extension of each angled part 22 is dimensioned so that when the angled parts 22 on both parts 12, 14 extend outward as in the position shown in FIGS. 1-6 (the expanded state of the fastener 10), the distance between the outward ends of the angled parts 22 is also larger than the diameter of the aperture in a foam construction element that is being connected using the fastener 10. As such, the fastener 10 cannot pass through the aperture when the angled parts 22 on both parts 12, 14 extend outward in the expanded state of the fastener 10 because the lower, undercut surfaces 26 of the angled parts 22 would face the surface surrounding the aperture in the foam construction element and contact it if an attempt were to be made to push the fastener 10 through the aperture from its upper end or pull the fastener 10 through the aperture from its lower end.

To ease insertion of the fastener 10 into the aperture in a foam construction element, a front surface of each angled part 22 has a first planar portion 28 and a second planar portion 30 at an obtuse angle to the first planar portion 28, which is angled outward from the central axis of the fastener 10 and downward away from the upper end of the fastener 10. This provides each angled part 22 with the undercut surface 26 that would face the surface surrounding the aperture and contact it if an attempt were to be made to push the fastener 10 through the aperture from its upper end or pull the fastener 10 through the aperture from its lower end.

Fastener 10 also includes a standing rib 32 that is rigid and extends outward in a radially direction at the upper end region of the fastener 10 alongside the two angled parts 22. The rib 32 may also be considered part of the arrowhead of the body of the fastener 10. The height of the rib 32, i.e., its dimension in the longitudinal or axial direction, may be the same as that of the angled parts 22. A front surface of the rib 32 has a first planar portion 34 and a second planar portion 36 at an obtuse angle to the first planar portion 34, which is angled outward from the central axis of the fastener 10 and downward away from the upper end of the fastener 10. This provides the rib 32 with an undercut, lower surface 38 that would face the surface surrounding the aperture and contact it if an attempt were to be made to push the fastener 10 through the aperture from its upper end or pull the fastener 10 through the aperture from its lower end.

The rib 32 extends rearward approximately perpendicular to the rear surfaces 34 of the angled parts to provide the upper end region of the fastener 10 with a trifold construction. That is, the upper end region of the fastener 10 has three sections that form a T-shape when the angled parts 22 are in their position further away from the rib 32, the rib 32 forming the center of the T-shape and the angled parts 22 forming the tops of the T-shape. Rib 32 has the same general cross-sectional shape as the angled parts 22. The angled parts 22 and rib 32 may not form an exact T-shape when installed, but what is important is that there are three separated points of contact provided by the arrowhead that comprises the angled parts 22 and the rib 32 to form a sort of a grappling hook if the hinge is opened to any degree from the compressed state of the fastener 10.

This trifold construction provides for secure retention of the upper end region of the fastener 10 in the foam construction by increasing the inability of the upper end region of the fastener 10 to pass through the aperture unless it is manually brought into the compressed state. For example, if an attempt were to be made to pull the fastener 10 through the aperture from its lower end, the undercut surfaces 26 of the angled parts 22 and the undercut surface 38 of the rib 32 would all be brought into contact with the surface around the aperture and prevent pulling of the fastener 10 through the aperture. Also, pressures arising during use of the structure formed from the foam construction elements might also urge the connected foam construction elements apart and this potential separation is prevented by the trifold construction of the fastener 10 at one end and the flange portion at the other end.

As mentioned above, by providing the angled parts 22 at the upper end of the body of the fastener 10, when the fastener 10 is in the expanded position, the angled parts 22 form an arrowhead 40. This arrowhead 40 is folded about the axis of the fastener 10 when the flanges 20 are respectively moved in the direction of arrows A to cause the angled parts 22 to abut opposite sides of the rib 32 and provide the arrowhead 40 with a compressed state, eliminating its arrowhead shape. The arrowhead 40 formed when the body of the fastener 10 is in the expanded state is about twice the width of the individual angled parts 22.

Assembly of two foam construction elements together is possible when the arrowhead 40 is in the compressed state by manipulating the fastener 10 so that the compressed arrowhead 40 engages with the surface surrounding an opening in one of these foam construction elements, possibly slides along that surface in view of the presence of the angled surfaces 30, 36 of the angled parts 22 and rib 32, aligns with and passes through that aperture (and possibly another aperture in the same element by engaging the surface surrounding this additional opening) and then engages with the surface surrounding an aligning aperture in the other one of these foam construction elements and passes through that aligning aperture (and possibly another aligning aperture in the same element by engaging the surface surrounding this additional aperture). In the compressed state of the fastener 10, the arrowhead 40 is about half as wide as it is when in the expanded state and so easily passes through the aligning apertures. It is also possible to connect a single foam construction element to itself at different locations, i.e., connect the different locations along the foam construction element to each other via aligning apertures in the different locations. In either assembly process, the fastener 10 might also pass through the central void of one or more of the foam construction elements, depending on the size of the fastener 10 relative to the dimensions of the foam construction elements.

The result of the above-described fastener insertion procedure is that the arrowhead 40 has passed through an aperture of each of the connected foam construction elements, but the flanges 20 do not pass through any apertures in the connected foam construction elements. As such, when the fastener 10 is unfolded, the expanded arrowhead 40 and rib 32 at the upper end of the fastener 10 provide three separated structures having surfaces that face the surface of the foam construction element and prevent reverse movement of the fastener 10 through the connected foam construction elements (unless the arrowhead 40 is again brought into the compressed state). The flanges 20 prevent removal of the fastener 10 at its lower end. The height of the parts 12, 14 between the upper surfaces of the flanges 20 and the lower surfaces 26, 38 of the angled parts 22 and rib 32 is selected to be the sum of the thicknesses of the foam construction elements being connected together.

An important feature of the rib 32 is that it is constructed and configured such that its presence does not impair the ability of the angled parts 22 to fold and provide the arrowhead 40 with a compressed state. Rather, the rib 32 has a small thickness, for example, the same thickness as the distance between adjacent longitudinally extending surfaces of the parts 12, 14 and thus the thickness of the hinges 16, 18. (see FIG. 3).

The rib 32 is a preferred component of the fastener 10 but should be considered optional. Such an additional standing rib can be included in the other embodiments herein to provide them with a trifold construction for the arrowhead.

The height of the parts 12, 14, and specifically the distance between the lower surfaces 26, 38 of the angled parts 22 and rib 32, respectively, and the upper surfaces of the flanges 20 is selected based on the foam construction elements to be used with the fastener 1. This distance, i.e., the operative height of the fastener 10, determines which foam construction elements can be secured and locked by the fastener 10. The fastener 10 passes completely through one noodle, as an example of a foam construction element, and into the center void of the adjacent noodle where the arrowhead 40 can spread, locking the two noodles together.

Two foam construction elements cannot have a total thickness that exceeds this distance because then the fastener 10 would not extend far enough into the second noodle to secure them. If the operative height is too large relative to the thickness of the foam construction elements, then the foam construction elements connected together would be very loose and could move and damage or impair the stability of the structure being constructed using the foam construction elements.

Different sizes of fastener 10 can be manufactured and sold in sets with specific thickness foam construction elements and specific diameter apertures therein. Such sets of foam construction elements and fasteners 10 designed to fasten two of these foam construction elements together are also considered to be an invention herein. The foam construction elements may be logs with a row of apertures on each lateral side, particularly those disclosed in other patent applications to the inventors herein as well as any pool or swim noodle-like product with a central void area. Conversely, for solid noodles with no central void area, the fastener 10 could pass completely through two or more solid noodles to lock them together.

In a variant of fastener 10, it is possible to construct the integral hinge mechanism or means as a single living hinge that extends from the upper end region to the lower end region of the fastener. Such a single hinge could be contiguous with the upper surface of the fastener and spaced apart from the lower surface of the fastener provided by the flanges 20, or vice versa. The longitudinal extent of such a single hinge is not material to the invention and any other configurations and sizes of hinges may be used, e.g., a single hinge that is centrally located.

Flanges 20 on the body, and barbs or angled parts 22 can have different constructions from that shown in FIGS. 1-6. The construction differences do not affect the functionality of the flange and angled part and are merely design choices, in this embodiment and in all of the embodiments herein, that do not limit the invention provided the flange and angled part provide the functions as disclosed herein. For example, it is possible that each angled part can present a semi-circular cross-section at its lower surface and the cross-sectional shape of the angled parts from the upper surface transitions to the semi-circular cross-section at the lower surface. Also, a front surface of the angled parts may be curved as well. As such, when the fastener is in its compressed state, the arrowhead formed by these angled parts has the approximate shape of a truncated cone, and is very easy to insert through aligning apertures in foam construction elements to be connected together using fastener.

Moreover, it is possible to provide parts 12, 14 that include a respective longitudinal portion extending from the upper surface of the fastener to its lower surface and that is alongside the hinge means. The longitudinal portions could overlap slightly with the flange and angled part. Inner edges of the longitudinal portions could be spaced apart from one another to define a channel between the parts with the hinge means being at a bottom of the channel.

Figure 7:
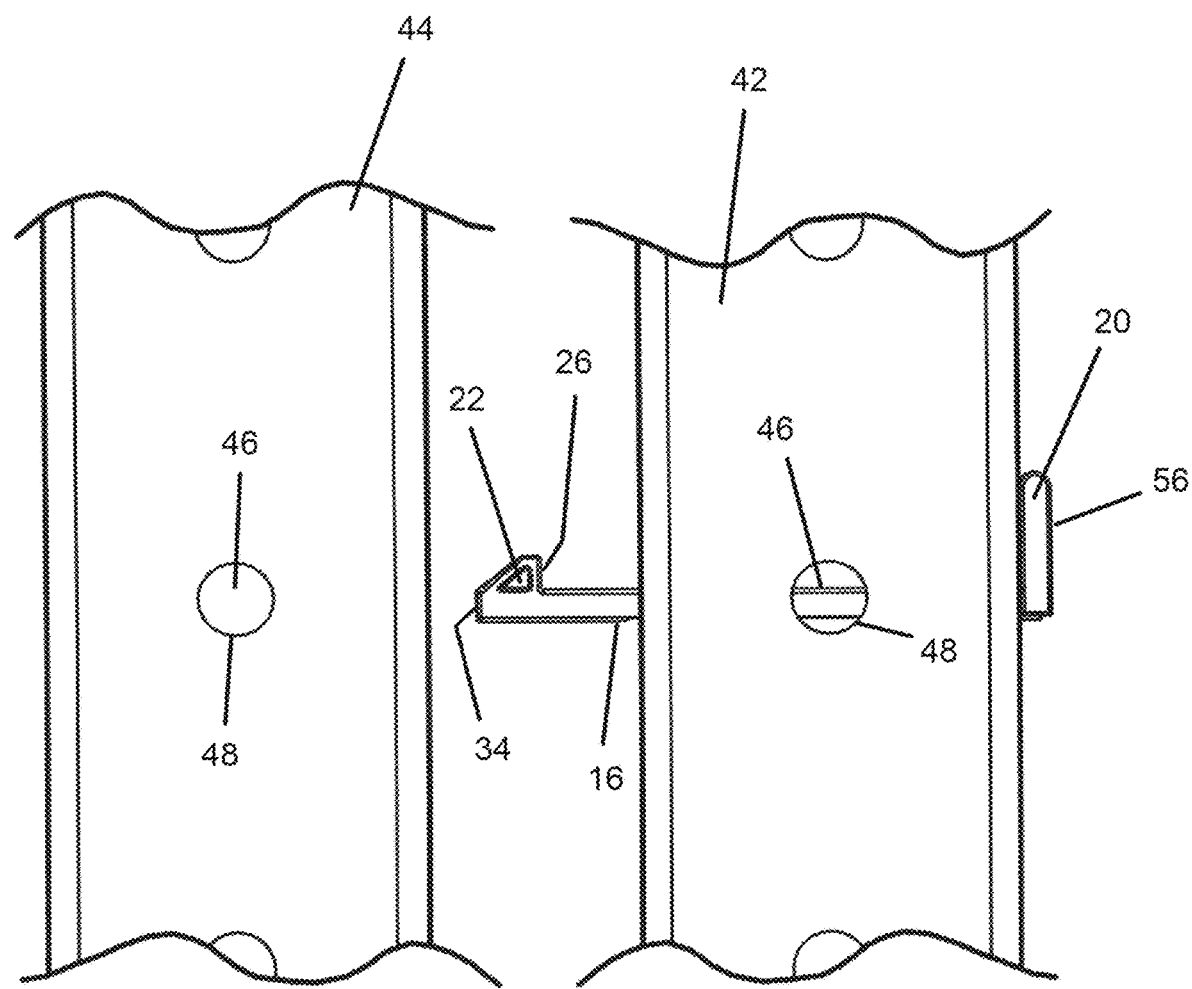
FIGS. 7 and 8 show the manner in which the fastener of FIG. 1 may be used to connect together two foam logs, as an example of a foam construction element.
Figure 8:
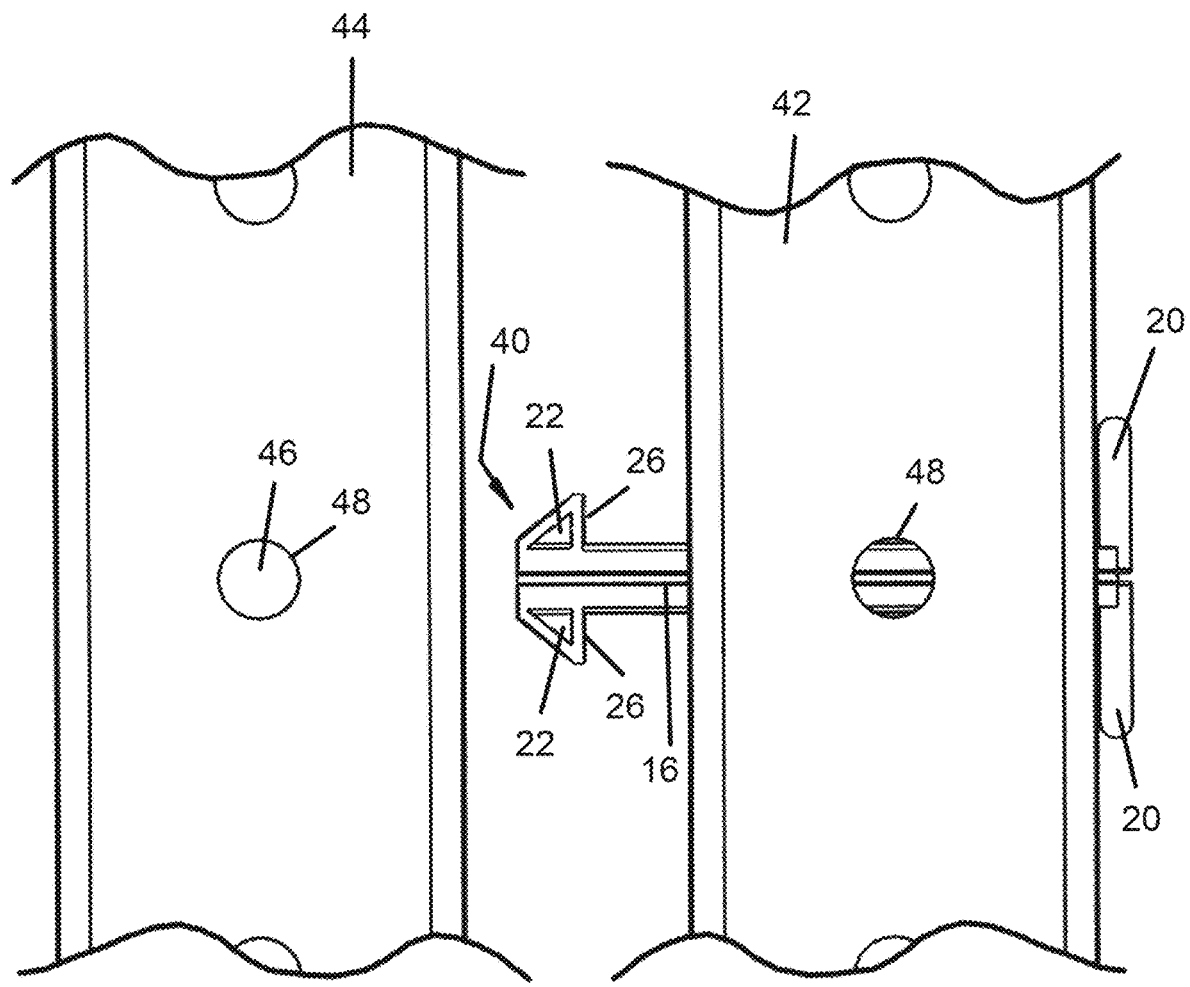

In an exemplifying, non-limiting use of fastener 10 depicted in FIGS. 7 and 8, the user passes fastener 10 completely through aligning apertures 48 in one foam construction element 42 including into and through the central void 46 of foam construction element 42 and through one of the aligning apertures 48 in the other foam construction element 44 into the central void 46 of foam construction element 44 before it is unfolded (see FIG. 7 wherein the fastener 10 is in its compressed state). Once unfolded into the expanded state shown in FIG. 8 (but which would be situated in the central void 48 of foam construction element 44 and not outside of it as shown), the fastener 10 would lock the foam construction elements 42, 44 together.

Similarly, the angled parts 22 are too wide to be easily inserted or removed from apertures in a foam construction element without being first folded back together reducing their width to half that of its unfolded symmetrical geometry. An asymmetrical geometry could be used as well but would not be as effective because the open width could not be as wide. Fastener 10 therefore relies on the hinges 16, 18 to alternate between the biased expanded state and the manually-derived compressed state.

FIGS. 9-13 show an extending fastener 80 which is converted between a rest state in which the fastener 80 secures two foam construction elements together and an extended state in which it is extended to enable it to pass through aligning apertures in the foam construction elements during an insertion or removal process. To this end, the fastener 80 includes an arrowhead 82 at its upper end that distorts from its normal state, or is extended as this term is used herein, so that the arrowhead 82 is narrower for inserting and removing it from aligning apertures in foam construction elements being connected together.

Fastener 80 includes a body having a support portion having two spaced apart, rigid walls 84 which extending longitudinally from a flange 86 at a lower end of the fastener 80. The arrowhead 82 is connected to both walls 84 and defines undercut surfaces 88 at a lower end, a planar upper surface 90 at an upper end, and angled surfaces 92 facing upward and extending between the undercut surfaces 88 and the planar surface 90. A rigid spine 94 is connected at its upper end to the inner side of the planar surface 90 of the arrowhead 82 and passes in a longitudinal extent between the walls 84 and through an aperture 96 in the flange 86 to extend beyond the lower surface 98 of the flange 86 (see FIG. 9).

Distortion of the arrowhead 82 to reduce its width is achieved by pushing on the portion of the spine 94 that extends beyond the flange 86 while holding the flange 86. The flange 86 can be held by the user's two fingers which is aided by upwardly curled edges of the flange 86. The user could use their index and middle fingers to hold the flange 86, one finger on each side of the support portion, and use their thumb to push the spine 94 upward.

Relative movement of the spine 94 to the walls 84 causes the spine 94 to push the planar surface 90 upward away from the walls 84 and thus, the undercut surfaces 88 and the angled surfaces 92 to move closer to the central axis of the body and possibly even become flat in possible alignment with the walls 84 (depending on the force being exerted by the upward pushing of the spine 94 relative to the flange 86). The arrowhead 82 has its width reduced in this state, in comparison to the rest state shown in FIGS. 9-12.

Upward pushing movement of the spine 92 may be limited the height of the spine 92 that is below the lower surface of the flange 86 when the fastener 80 is in the rest state since the spine 92 should be configured to preclude pushing it entirely through the aperture 96, yet still allow for sufficient distortion of the arrowhead 82, as follows.

Distortion or elongation of the arrowhead 82 narrows the barbed profile of the fastener 80 so that the fastener 80 is able to slide into and out of aligning apertures in the foam construction elements being connected together (which are designed in combination with one another). When the fastener 80 passes through aligning apertures in two foam construction elements and the arrowhead 82 is slid into and through the central void inside one or both of these adjacent foam construction elements, and released to allow the reformation of the arrowhead 82, the force pushing the spine 94 is released and then the fastener 80 returns to its original state (whether automatically or upon exertion of manual force). The arrowhead 82 is reformed, thereby making it difficult to slide into or out of the aligning aperture of the connected foam construction elements because the arrowhead 82 is intentionally designed to be wider than the aperture diameter. This fastener 80 works on translation of one element relative to the others.

FIGS. 14-18 show an elongate unitary fastener 100 that includes on its singular body, two adjacent longitudinally extending parts 102, 104, a head 106 formed at the upper end regions of the parts 102, 104. Each of the parts 102, 104 includes a wall 108, 110 and a flange 112, 114 at the bottom of the wall 108, 110. One of the parts 102 has a pair of separated guide walls 116, 118 that project inward from respective peripheral edges of the wall 108 while the other part 104 has a longitudinally extending rib 120 projecting inward from the wall 110 that is configured to be between the walls 116, 118 when the parts 102, 104 are brought together. The fastener 100 has a generally uniform thickness.

The head 106 includes an upper planar portion 122 and curved portions 124 extending from opposite edges of the planar portion 122 to the upper ends of the walls 108, 110. The upper planar portion 122 and curved portions 124 are slightly rigid and not entirely flexible so that they will hold their shape. The body of the fastener 100 is configured to cause the parts 102, 104 to inherently separate from one another at the lower end, which may be possible through construction and configuration of the curved portions 124.

In this embodiment, the head 106 does not distort to change its shape as do the arrowheads in other embodiments disclosed herein. Rather, the head 106 is adjusted to change its orientation from a state in which it is unable to pass through an aperture in a foam construction element and a state in which it is able to pass through an aperture in a foam construction element.

More specifically, the fastener 100 functions to enable its passage through aligning apertures in one or more foam construction elements by sliding one longitudinally extending part 102 relative to the adjacent longitudinally extending part 104 while the parts 102, 104 are adjacent one another and the rib 120 is between the walls 116, 118. The presence of the rib 120 between the walls 116, 118 serves to provide a guide for the sliding movement of the rib 120 and thus movement of the part 104 relative to the part 102. Other structural and functionally comparable guide means for guiding the movement of one part 102 relative to the other part 104, or vice versa, are considered to be encompassed within the meaning of guide means in accordance with the invention.

Figure 19:
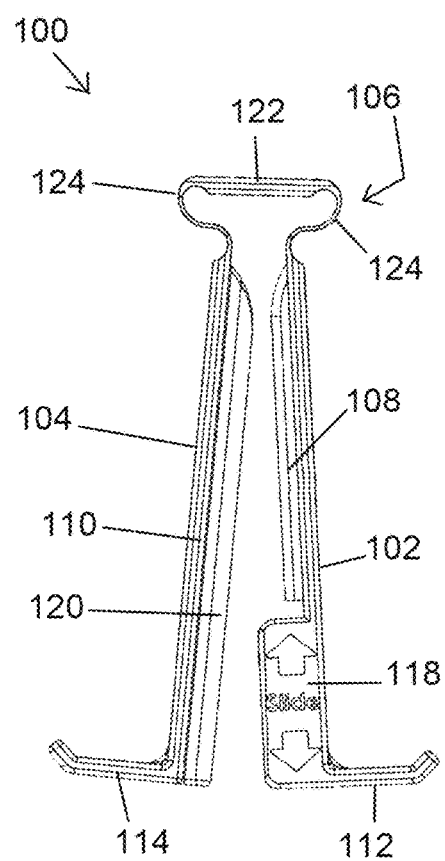
FIGS. 19-21 show the manner of use of the fastener of FIGS. 14-18.

FIG. 19 shows a rest state in which the fastener 100 is not yet ready for insertion through aligning apertures to, for example, connect two adjacent foam construction elements together. This is its rest state to which it is biased. In FIG. 19, both parts 102, 104 of the fastener 100 are even with each other having been brought manually together in preparation for the foam construction element connection procedure, and the planar portion 122 is normal (perpendicular) to the parallel walls 116, 118 and is too wide to be inserted through or removed from an aperture in a foam construction element.

Figure 20:
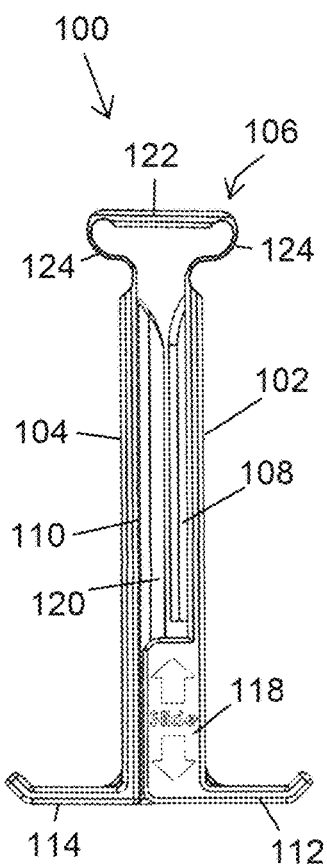
Figure 21:
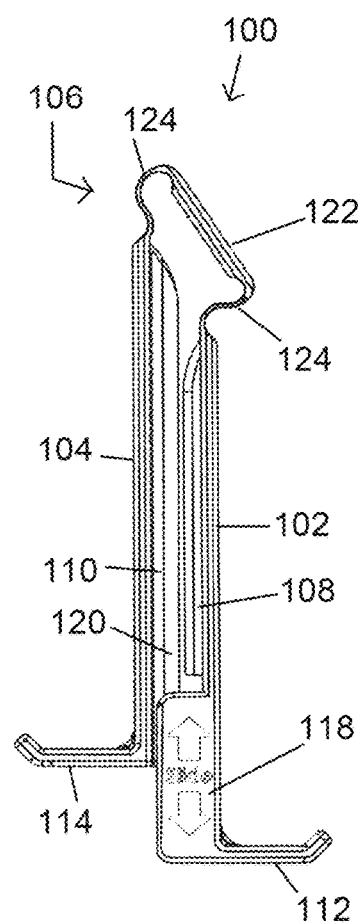

This fastener 100 generally works on translation or pushing one part relative to other parts. As such, to start the connection procedure, the parts 102, 104 are brought together to position the rib 120 between the guide walls 116, 118 (FIG. 20). The fastener 100 is not able to be inserted through any apertures in cooperating foam construction elements at this stage, because the head 106 has a width that is larger than the diameter of the aperture. However, by sliding part 104 relative to part 102, which sliding movement is eased by the presence of the rib 120 between the guide walls 116, 118, the head 106 is skewed to one side and its width is reduced to close to that of the parts 102, 104 in combination (see FIG. 21). This sliding movement can be achieved by the user putting two of their fingers on the flanges 112, 114 and pushing with their thumb one of the flanges 112, 114 upward while maintaining the other flange 112, 114 in the same position.

The head 106 assumes and maintains its skewed or angled state only so long as the pressure is maintained to keep the parts 102, 104 longitudinally displaced from one another. Once the user releases pressure, after the fastener 100 is connecting two foam construction elements together, the fastener 100 returns to its biased rest state as shown in FIG. 20 and in this state, the fastener 100 cannot be removed through the apertures in the foam construction elements.

Optional text to aid in the use of the fastener 100 may be provided on the outer surfaces of the guide walls 116, 118 and/or on the bottom surfaces of the flanges 112, 114.

The plastic material from which the fasteners disclosed above may be made may be any conventional plastic that performs the objects of the invention in that it enables a reduction in the size of the arrowhead or tip of the fastener upon manual manipulation and then return to the expanded form once inserted through an aperture of a log or other playset component.

For optimal use of the fasteners disclosed herein, the foam construction elements should be made of a material at least in the area around the apertures that can flex slightly. The arrowheads of the disclosed fasteners are configured to operatively engage with this slightly flexible area and push it outward until the arrowhead passes through the aperture at which time the area returns to its initial, non-stressed state. For this reason, the construction elements cannot be made of, for example, steel, which does not flex in which case, the arrowheads would be slightly too large to pass through the aperture. Design of the arrowheads as disclosed is intended to maximize the holding grip at the top of the fastener where the arrowhead is situated, and then at the bottom where the flanges are to have an improved geometry to open and close the arrowheads from the distant end of the fastener.

The fasteners disclosed herein allows the foam construction elements, colloquially termed pool noodles, to be locked together, one upon another, i.e., one beside another or one across the top of another, or in a state in which the pool noodles can rotate freely relative to one another, or in a state in which the pool noodles can be pivoted to lock together in unique formations. Indeed, the fasteners are configured to hold flexible foam in a wide range of removably locked positions.

Additional information about fasteners or connectors for foam construction elements, manufacture and use thereof, and various foam construction elements and use thereof to construct three-dimensional objects is present in one or both of the inventors' other U.S. patent applications, including U.S. patent application Ser. No. 15/344,333 filed Nov. 4, 2016, U.S. patent application Ser. No. 15/951,199 filed Apr. 12, 2018, U.S. patent application Ser. No. 16/664,891 filed Oct. 27, 2019, U.S. patent application Ser. No. 16/884,258 filed May 27, 2020, U.S. patent application Ser. No. 18/052,930 filed Nov. 6, 2022, and U.S. patent application Ser. No. 18/303,107 filed Apr. 19, 2023, all of which are incorporated by reference herein.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. Among other modifications, features of the U.S. patent documents mentioned above, all of which are incorporated by reference herein, can be used in the fasteners or connectors in accordance with the invention to the extent possible, and all such modifications are considered by the inventors to be part of their invention.

The invention claimed is:

1. A fastener for foam construction elements, comprising:
    an elongate body having a first end, a second end opposite to said first end, and a central longitudinally extending axis,
    said body comprising:
        a first elongate part having a first end and a second end opposite the first end;
        a second elongate part having a first end and a second end opposite the first end;
        a head connected to said first end of said first elongate part and said first end of said second elongate part, said head being biased when in a rest state of said body to have a width that is larger than a width of said head when said body is not in the rest state, said first and second parts being movable relative to one another to change the width of said head; and
        a flange at said second end of each of said first and second parts, said flanges projecting outward from the central axis of said body; and
        hinge means between said first and second parts and defining a pivot axis in a longitudinal direction for enabling said first and second parts to pivot about said pivot axis to thereby reduce the width of said head.

2. The fastener of claim 1, wherein said head is shaped as an arrowhead with a smaller upper cross-section than a lower cross-section.

3. The fastener of claim 1, wherein said head comprises an angled part connected to said first part and an angled part connected to said second part, each of said angled parts having a first planar portion, a second planar portion at an obtuse angle to said first planar portion and which is angled outward from the central axis of said body and away from said first end of said body, and undercut surfaces that connect to said first and second parts.

4. The fastener of claim 1, wherein said body has a unitary, one-piece construction.

5. The fastener of claim 1, wherein said hinge means extend between said first and second parts.

6. The fastener of claim 1, wherein said hinge means comprise a first hinge at said first end of said body and a second hinge at said second end of said body, said second hinge being separated from said first hinge.

7. The fastener of claim 1, wherein said first and second parts are mirror image parts.

8. The fastener of claim 1, wherein said flanges in combination have a width in the rest state of said body larger than a width of said angled parts in combination in the rest state of said body.

9. The fastener of claim 1, wherein said head comprises an angled part connected to said first part and an angled part connected to said second part, and said body further comprises a standing rib alongside said angled parts and extending perpendicular to a rear surface of said body, said rib providing in combination with said angled parts a trifold construction for said body.

10. The fastener of claim 9, wherein said rib is rigid and forms a T-shaped with said angled parts when said angled parts are fully extended away from said rib.

11. The fastener of claim 9, wherein said rib has the same cross-sectional shape as said angled parts.

12. The fastener of claim 1, wherein said head comprises an angled part connected to said first part and an angled part connected to said second part, each of said angled parts presenting a semi-circular cross-section at a lower surface and a cross-sectional shape of said angled parts from an upper surface transitioning to the semi-circular cross-section at the lower surface.

13. The fastener of claim 1, wherein said hinge means comprise a single hinge between said first and second parts, each of said first and second parts including a respective longitudinal portion extending from an upper surface of said body to a lower surface of said body alongside said hinge, inner edges of said longitudinal portions being spaced apart from one another to define a channel and said hinge being at a bottom of said channel.

14. A fastener for foam construction elements, comprising:
    an elongate body having a first end, a second end opposite to said first end, and a central longitudinally extending axis,
    said body comprising:
        a first elongate part having a first end and a second end opposite the first end;

a second elongate part having a first end and a second end opposite the first end;

a head connected to said first end of said first elongate part and said first end of said second elongate part, said head being biased when in a rest state of said body to have a width that is larger than a width of said head when said body is not in the rest state, said first and second parts being movable relative to one another to change the width of said head; and a flange at said second end of each of said first and second parts, said flanges projecting outward from the central axis of said body; and wherein said first part comprises a longitudinally extending wall and a pair of spaced apart guide walls extending inward from peripheral edges of said wall of said first part, said second part comprising a longitudinally extending wall and a rib extending inward from said wall of said second part apart from peripheral edges of said wall of said second part, said rib being configured to lie between said guide walls when said walls of said first and second parts are adjacent one another, said first and second parts being movable relative to one another when said walls of said first and second parts are adjacent one another to cause said head to change its width.

15. The fastener of claim 14, wherein said head comprises a planar portion and curved portions extending from opposite edges of said planar portion to ends of said walls of said first and second parts, the width of said head being changed by changing an orientation of said head upon movement of said first and second parts relative to one another.

16. The fastener of claim 14, wherein said first and second parts are biased into a state in which said walls of said first and second parts are apart from one another.

17. The fastener of claim 14, wherein said flanges in combination have a width in the rest state of said body larger than the width of said head in the rest state of said body.

18. A fastener for foam construction elements, comprising:

an elongate body having a first end, a second end opposite to said first end, and a central longitudinally extending axis, said body comprising:

a first elongate part having a first end and a second end opposite the first end;

a second elongate part having a first end and a second end opposite the first end;

a head connected to said first end of said first elongate part and said first end of said second elongate part, said head being biased when in a rest state of said body to have a width that is larger than a width of said head when said body is not in the rest state, said first and second parts being movable relative to one another to change the width of said head, said head comprising an angled part on said first part and an angled part on said second part; and a flange at said second end of each of said first and second parts, said flanges projecting outward from the central axis of said body; and a standing rib alongside said angled parts and extending perpendicular to a rear surface of said body, said rib providing in combination with said angled parts a trifold construction for said body.

19. The fastener of claim 18, wherein said rib is rigid and forms a T-shaped with said angled parts when said angled parts are fully extended away from said rib.

20. The fastener of claim 18, wherein said flanges in combination have a width in the rest state of said body larger than a width of said angled parts in combination in the rest state of said body.

* * * * *